Sept. 15, 1970　　　JIRO KOSUGA　　　3,528,855
HERMETICALLY SEALED BATTERY AND METHOD OF MAKING
Filed July 18, 1967　　　　　　　　　2 Sheets-Sheet 1

INVENTOR.
JIRO KOSUGA
BY
Edward T. Okubo
ATTORNEY

United States Patent Office 3,528,855
Patented Sept. 15, 1970

3,528,855
HERMETICALLY SEALED BATTERY AND METHOD OF MAKING
Jiro Kosuga, 2–890 Narimune Suginami-ku, Tokyo, Japan
Filed July 18, 1967, Ser. No. 654,203
Claims priority, application Japan, July 21, 1966, 41/47,355
Int. Cl. H01m 35/00, 35/18
U.S. Cl. 136—6             9 Claims

ABSTRACT OF THE DISCLOSURE

A hermetically sealed secondary storage battery where the negative and positive electrode plates are fully charged or substantially fully charged during the final stage of the charging operation and in which excess electro-chemical capacity is not required in the negative electrode plate. A hydrogen dispersing or absorbing means is provided in the battery casing so that hydrogen generated within the battery can be dispersed to the exterior of the casing or absorbed and fixed within the hydrogen absorbing means. A method of manufacturing a hermetically sealed battery is also disclosed.

---

The present invention relates to a novel hermetically sealed secondary battery, and more particularly to a hermetically sealed battery constructed such that the negative and positive electrode plates become fully charged or substantially fully charged at the last stage of the charging operation regardless of the respective electro-chemical capacity of said negative and positive electrode plates and wherein a portion of said negative electrode plate is exposed above the electrolyte of said battery.

It is well known that in a sealed secondary battery, oxygen is generated at the positive electrode when the battery is being charged and the oxygen must be absorbed and consumed by the negative electrode in order to avoid excessive pressure buildup within the battery. Under such circumstances, in a construction in which the electrodes are immersed in the electrolyte under the liquid surface, as in the case with an ordinary liquid storage battery, generated oxygen gas cannot contact the surface of the negative electrode due to interference of the electrolyte. Therefore, in the conventional hermetically sealed alkaline storage battery, a minimal amount of electrolyte is held in the pores of the electrodes and the separators by capillary action, thus exposing the electrodes above the electrolyte. A hermetically sealed lead-acid storage battery is also constructed such that a minimum quantity of electrolyte is held in the pores of an acid resistant glass-wool fibre and the electrodes to limit the mobility of the electrolyte so that only the surfaces of the electrodes are covered by a film of the electrolyte.

Generally, there are two types of hermetically sealed secondary batteries commercially available. One is a hermetically sealed alkaline storage battery using nickel oxide and metallic cadmium as the active materials and a solution of potassium hydroxide as the electrolyte. The other is a hermetically sealed lead-acid storage battery using lead peroxide and metallic lead as the active materials and a dilute sulphuric acid solution as the electrolyte. Both types produce relatively large quantities of oxygen and hydrogen gases during charging and discharging and especially during over-charging and over-discharging.

Various methods have been devised for dealing with the generated gases or for controlling the generation of such gases. Perhaps the most successful method devised is disclosed in Neumann et al. U.S. Pat. No. 2,571,927. The battery of U.S. Pat. No. 2,571,927, simply characterized, utilizes a minimal amount of electrolyte and requires the electrochemical capacity of the negative electrode to be substantially larger than the positive electrode so that excess uncharged capacity is retained in the negative electrode at all times, thus insuring that hydrogen evolution will not occur.

These commercially available hermetically sealed secondary batteries have been found to be deficient when compared with open type batteries, especially in their charging and discharging performance and in cycle life. It is, of course, recognized that battery performance varies with operating conditions; with due regard to this fact, it has been shown that there is a great difference in performance between the open type secondary batteries and the hermetically sealed secondary batteries. For example, the cycle life (charging and discharging) of open type nickel-cadmium storage batteries is in the order of several thousand cycles. The cycle life of a comparable hermetically sealed nickel-cadmium battery is on the order of several hundred cycles and, in extreme cases, the capacity of the battery is reduced to one-half of its initial capacity after one hundred cycles. Similarly, the cycle life of open type lead-acid storage batteries is in the order of several hundred cycles while a comparable hermetically sealed lead-acid battery has a cycle life of about one hundred cycles. It has also been found that the discharge capacity of the hermetically sealed batteries showed similar though not as dramatic differences.

It is accordingly an object of the present invention to provide a hermetically sealed battery having superior charging characteristics, particularly a short charging time.

Another object is to provide a battery having a large discharge capacity.

Still another object is to provide a hermetically sealed battery having a long cycle life.

A still further object is to provide a battery in which excess electro-chemical capacity is not required in the negative electrode.

Still another object is to simplify the method of manufacturing an inexpensive and highly efficient hermetically sealed secondary battery.

These and other objects and advantages will become readily apparent to those skilled in the art from the following detailed description and disclosure, especially in light of the accompanying drawings, in which.

Figure 1:
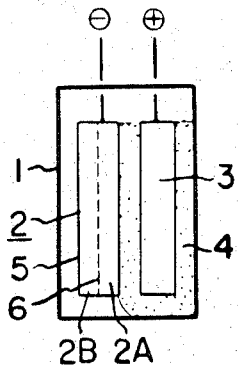
FIG. 1 is a diagrammatic sectional view of a conventional hermetically sealed secondary battery.

Referring to the drawings, FIG. 1 shows the construction of a typical conventional hermetically sealed secondary battery, wherein 1 is the sealed container, 2 is the negative electrode, 3 is the positive electrode, 4 is both a separator and a holder for the electrolyte, and 5 is a portion of the negative electrode exposed from the electrolyte. 2A is the portion of the negative electrode facing the positive electrode and has an electro-chemical capacity equal to that of the positive electrode. 2B is the remainder of the negative electrode and is the portion constituting the excess uncharged capacity.

Figure 2:
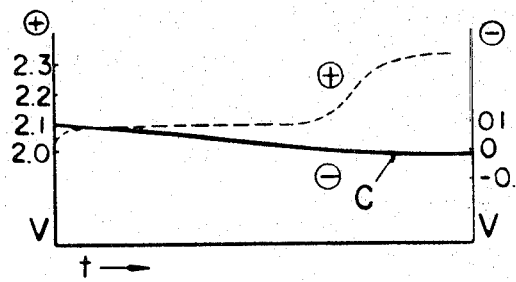
FIG. 2 is a graph showing the charging characteristics of the positive and negative electrodes of a conventional hermetically sealed lead-acid storage battery.
Figure 3:
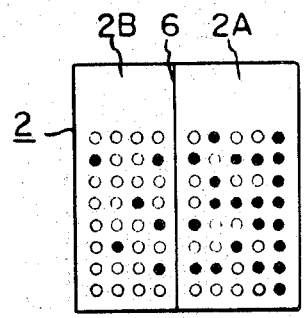
FIG. 3 is a diagrammatic view showing the charging distribution of the particles of the active material of the negative electrode in a conventional hermetically sealed secondary battery, wherein a black circle shows a charged particle and a white circle shows an uncharged particle.
Figure 4:
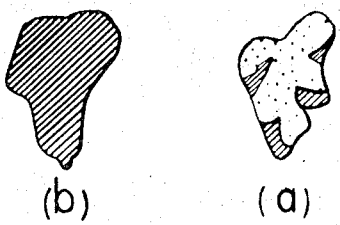
FIG. 4 is an enlarged view of the particles of the active material of the negative electrode in a conventional hermetically sealed secondary battery, wherein (a) shows an uncharged particle and (b) shows a charged particle, the lined portion showing the charged portion on the surface or in the interior of the particle and the unlined portion showing the uncharged portion thereof.

FIG. 2 is a graph showing the relationship of charging voltage to charging time in a conventional hermetically sealed lead-acid storage battery, wherein the dotted-line shows the potential of the positive electrode to charging time and the full line shows the potential of the negative electrode to charging time. It is apparent from the drawing that at the final stage of the charging operation the positive electrode terminates its charging; the positive electrode potential is then considered sufficiently noble. On the other hand, there remains a considerable uncharged portion on the negative electrode and therefore the negative electrode potential resides at the level shown by C in FIG. 2. The level C does not reach the less noble potential (which is indicated by the point E in FIG. 5 described hereinunder) required to efficiently operate the negative electrode of the hermetically sealed secondary battery. Under this circumstance, when further charging is continued, a considerable amount of oxygen gas is generated at the positive electrode. Under optimum conditions, the generated oxygen gas should be absorbed and consumed by the negative electrode 2. However, in the conventional sealed secondary battery shown schematically in FIG. 1, the portion 5 or the uncharged portion 2B is not activated completely and, therefore, the oxygen gas absorption and consumption at the portion 5 or the uncharged portion 2B is generally inactive and the reaction only takes place at the boundary 6 between the portion 2A and the uncharged portion 2B shown by the dotted line in FIG. 1. It is noted from the above description that, because of the existence of the uncharged portion 2B the reacting region where the reaction between the negative electrode active material and the oxygen gas occurs is in the interior of the negative electrode rather than the exposed portion 5 of the negative electrode. Accordingly, the diffusion path for the oxygen gas is increased and the contact area necessary for the reaction is decreased. Moreover, since the electrolyte is held within the pores of the negative electrode by capillary action, it will be apparent that the reaction with the oxygen gas is further hindered. Accordingly, it will be seen that the uncharged portion 2B acts substantially to prevent the combining reaction between the oxygen gas and the active material of the negative electrode. Of course, the uncharged portion acts to suppress the occurrence of hydrogen gas at the negative electrode for a short period after the secondary battery is constructed. However, thereafter the uncharged portion is little concerned in the electro-chemical oxidation and reduction of the charging and discharging operation, so the uncharged portion progresses into a passive state with the lapse of time which gradually deteriorates the hydrogen gas suppressing characteristics thereof. Finally, the uncharged portion will lose substantially all its suppressing function against the occurrence of hydrogen gas. At this point, the uncharged portion 2B will be not only an obstacle against the oxygen gas absorbing reaction but also an obstacle against the natural charging and discharging reaction of the secondary battery. In other words, the existence of the passive uncharged portion increases the resistive polarization and the density polarization of the negative electrode and the negative electrode potential at the last stage of the charging operation is less noble and at last it reaches more than the water resolving voltage, thereby providing a reverse effect—to promote the generation of hydrogen gas. Thus, said reverse effect increases the internal pressure in the hermetically sealed battery which deforms the battery case breaking the hermetic seal.

As above noted, the uncharged portion 2B in the negative electrode is effective to suppress the generation of hydrogen gas in the negative electrode for a time after the battery is manufactured. However, I have found that the uncharged portion of the negative electrode can be decreased or even eliminated and still provide improved operating characteristics in a hermetically sealed secondary battery produced by an improved economical manufacturing process.

The following description will illustrate why a battery according to the present invention can operate efficiently as a secondary battery even though the negative electrode contains no excess uncharged capacity. In normally charging the present battery, the generation of oxygen occurs earlier than hydrogen, so there is no necessity for a suppressing means against hydrogen generation; the absorption and consumption of the generated oxygen and the prevention of hydrogen generation proceeds in the usual manner since the negative electrode (as well as the positive electrode) is in the uncharged condition.

On the other hand, in initially charging the present battery, the negative and positive electrodes tend to generate at nearly the same time a small amount of oxygen and hydrogen because said electrodes are in the fully charged or substantially fully charged condition. However, even in this case, generated oxygen is rapidly absorbed and consumed by the negative electrode and thereby the further generation of hydrogen is terminated. Therefore, there is observed a temporary short-time peak phenomenon on the internal pressure of the battery and the charging voltage-time characteristics curve shown in FIG. 7. Subsequent charging and discharging cycles proceed as above described for normal charging. Generally speaking, the increase in the internal pressure of the present battery resulting from said generated hydrogen gas is very small and can be disregarded in ordinary usage. However, as countermeasures against an unexpected malfunction of the battery resulting from repeated charging and discharging operations or from some uneven characteristics of the battery (unavoidable) in the manufacturing process, and against an accumulation of some amount of hydrogen resulting from self-discharge of the negative electrode of the battery on standing for a long period, it is desirable to disperse said generated hydrogen to the exterior of the casing or to diffuse and fix (capture) said generated hydrogen in the material of the battery casing.

Figure 7:
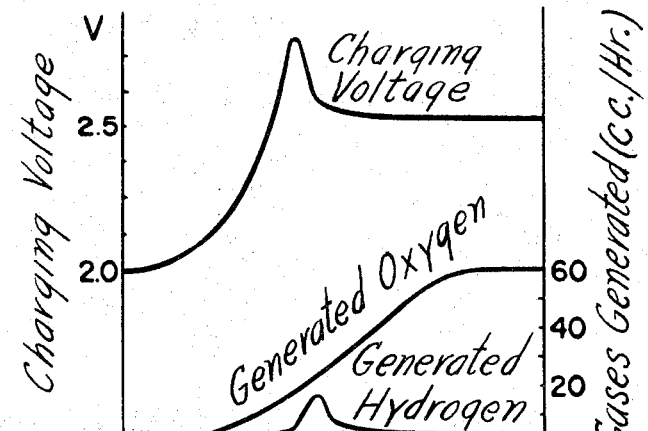
FIG. 7 is a graph showing the relation between the charging voltage and the amount of gas generated during overcharge in a hermetically sealed lead-acid storage battery constructed according to the present invention.

It has been found that the dispersion or capture of the hydrogen serves not only to prevent increase in internal pressure resulting from the generated hydrogen but also prevents further generation of hydrogen resulting from subsequent charging and discharging operation of the battery and promotes the absorbing and consuming reaction of oxygen. In this case, in order to increase the speed of the combining reaction between the negative electrode and oxygen, it is necessary to disperse or selectively capture only generated hydrogen; it is impossible to obtain the desired effect if the generated oxygen as well as the generated hydrogen is simultaneously dispersed or captured. Accordingly, if a valve or vent is adapted to open the air-tight battery casing for the purpose of dispersing the hydrogen gas, the oxygen which coexists with the hydrogen is also dispersed and thereby the further combining reaction of the negative electrode with the oxygen will be unable to progress efficiently. Moreover, the dispersion of the oxygen causes the negative electrode to generate hydrogen again and thereby increases the internal pressure of the battery. On the other hand, by dispersing or selectively capturing only the hydrogen as illustrated above, there is no progressive increase in the internal pressure of the battery, but rather there is provided the steep drop characteristics of the charging voltage as shown in FIG. 7 and also a large decrease in the generation of hydrogen.

Figure 5:
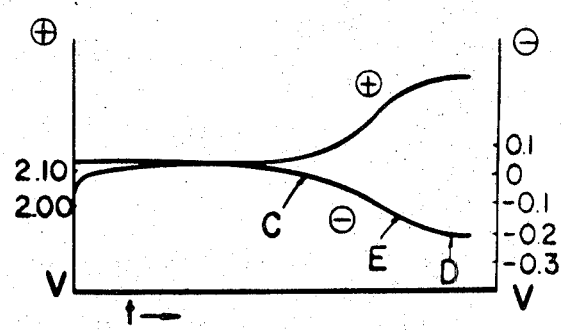
FIG. 5 is a graph showing the charging characteristics of the positive and negative electrodes of an open type lead-acid storage battery.

Though the theory of the aforenoted phenomena is not known, one possible theory is as follows: Referring to FIG. 5, where D indicates the negative electrode potential when the negative electrode is in the fully charged condition and is generating hydrogen, and E indicates a potential which is slightly more noble than the point D; at the point E the negative electrode reacts to combine with the generated oxygen. In other words, at the point E all the oxygen generated by the positive electrode is being recombined at the negative electrode and the rate of electrical charging of the negative electrode is equal to the rate of chemical discharge caused by the reaction with the generated oxygen thus reaching a state of dynamic equilibrium. Accordingly, it is necessary for an ideal hermetically sealed secondary battery that at the last stage of charging operation the negative electrode potential is always kept at point E shown in FIG. 5. In order to provide this condition, the oxygen absorbing ability of the negative electrode should be very high, and, therefore, it is important to decrease the amount of the uncharged portion of the negative electrode.

According to one manufacturing process of the present invention, the negative electrode is charged in a preparatory electrolytic-bath so as to make the negative electrode potential reach the point D shown in FIG. 5. However, when the negative electrode thereafter contacts with ambient air prior to being sealed, the negative electrode potential is apt to move towards a point nobler than the point E. Therefore, in order to prevent this happening, it is desirable to charge the negative electrode completely in the battery casing after sealing.

However, when there is a large amount of uncharged portion in the negative electrode as in a conventional battery, the negative electrode potential reaches, for example, a potential such as the point C shown in FIG. 5. In this instance, if the charging current is low, the negative electrode can absorb and consume all generated oxygen although with difficulty, but if the charging current is high, oxygen generation is greater than oxygen absorption and consumption so that oxygen is accumulated slowly in the battery casing and the internal pressure of the battery will be progressively increased.

As illustrated above, the most preferable means for obtaining the desired operation of hermetically sealed secondary batteries is to disperse the hydrogen generated at the final stage of the charging operation to the exterior of the sealed battery casing or to diffuse and fix said hydrogen in the sealed battery casing material for the purpose of obtaining the same effect as hydrogen dispersion.

According to the conventional hermetically sealed secondary battery, it is a basic design principle to prevent all of the gases generated in the interior of the battery from dispersing. On the other hand, in accordance with the present battery, it is a basic design principle not to prevent all of the gases from being dispersed but rather to positively promote hydrogen dispersion.

A means adapted to disperse the hydrogen to the exterior of the casing or to diffuse and fix said hydrogen in the battery casing is illustrated as follows: Palladium in the state of a plate or powder, palladium-black, palladium-asbestos or the like may be utilized as the means adapted to fix the hydrogen gas in the battery casing material, said palladium or composition thereof having absorption characteristics capable of absorbing about six-hundred times its own volume of hydrogen at room temperature. It is only necessary to dispose said hydrogen absorbing material in the chamber of the battery casing in such a way that it is not wet by the electrolyte and it is not necessary to contact said hydrogen absorbing material with either the negative electrode or the positive electrode. On the other hand, in order to disperse the hydrogen to the exterior of the battery casing, the casing or a part thereof is constructed out of a thin palladium plate or of plastic materials having good permeability characteristics to hydrogen. Though the conventional sealed nickel-cadmium storage battery utilizes a rubber, plastic or similar material in the sealed portion thereof as an insulator, this material does not utilize the principles of the present invention, that is, it does not positively aim to disperse hydrogen to the exterior of the battery casing.

The permeation of gases through a solid state material can be considered from two points of view as follows:

First, it is noted that permeation is governed by Fick's Law, namely, the permeable amount N of the gas can be expressed by the following formula:

$$N = D \frac{A}{d} \cdot \Delta p \cdot t$$

wherein, A is the permeation velocity, d is the thickness of the solid state material measured in the permeating direction, $\Delta p$ is the pressure difference between both sides of the solid state material, t is elapsed time, and D is the permeation coefficient. Accordingly, in designing the battery casing of a hermetically sealed secondary battery, because the pressure difference $\Delta p$ should be small, it is necessary to select a solid state material having a large permeation coefficient D and then to make the permeation velocity A as large as possible and the thickness d as small as possible, respectively, so that the permeable amount of gas per unit time may increase under the constant pressure difference $\Delta p$. Secondly, in order for a gaseous molecule or water molecule to permeate various kinds of materials, it is necessary that there be gaps or pores in said material, each of which has a diameter larger than the effective diameter of the permeating molecule. Referring to Table 1, it is seen that the hydrogen generated in the secondary battery is the most diffusible or permeable gaseous molecule because the effective diameter of the hydrogen molecule is the smallest of the gaseous bodies and the molecule motion velocity thereof is the largest.

TABLE 1.—EFFECTIVE DIAMETERS OF GASEOUS MOLECULES

| Gas | Distance among atoms (A.) | Effective diameter (A.) |
| --- | --- | --- |
| $H_2$ | 0.75 | 2.47 |
| $H_2O$ | 1.01 | 2.70 |
| $O_2$ | 1.20 | 2.98 |
| $HCl$ | 1.28 | 3.00 |
| $N_2$ | 1.10 | 3.18 |
| $CO_2$ | 1.15 | 3.30 |

In accordance with Table 1, the effective diameter of the water molecule ($H_2O$) is smaller than that of any of the gaseous molecules except for hydrogen. Accordingly, by a proper selection of material, it is possible to insure that only hydrogen will permeate the selected material. The preferable materials can be selected from among various synthetic resinous materials and various natural or synthetic rubbers. By varying the molecular weight, additives, plasticizers or the like of such resinous materials, it is possible to provide a material which is preferable to the permeation of hydrogen to the exclusion of other gaseous molecules present in a sealed secondary battery.

A more detailed explanation of the permeation of gases, water molecules or the like in plastic materials can be found on pages 139, 140, 141, 142, 144, 146, 150, 194, 196, 198, 200, 202, 205, 206, 208, 210 and 213 of the March 1966 issue of "Modern Plastics."

In order to disperse only hydrogen to the exterior of the sealed battery by utilizing the dispersion phenomena of gaseous molecules, it is necessary to select a material which selectively permits only hydrogen permeation and then to construct a part of the casing or to fit a sheet of said material into a part of the casing. Such material can be selected from various synthetic resinous plastic materials or various kinds of natural or synthetic rubbers as described hereinabove, or from metals such as metallic palladium and alloys thereof. In utilizing such materials, it is necessary that the material be able to mechanically withstand the expected internal pressure of the battery and it should be affixed to the battery casing so as to increase the permeable area thereof.

Figure 6:
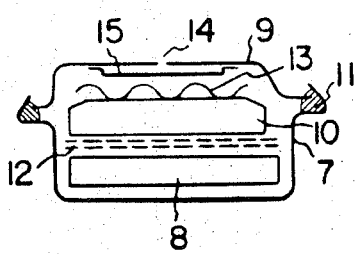
FIG. 6 is a sectional view showing the construction of a hermetically sealed nickel-cadmium storage battery according to the present invention.

FIG. 6 shows an embodiment of a hermetically sealed nickel-cadmium storage battery in accordance with the present invention, wherein 7 is a battery casing of steel plated with nickel and also serves as the external conductor for the positive electrode 8. 9 is a cover and also serves as the external conductor for the negative electrode 10. 11 is a packing which exists between the casing 7 and the cover 9 and is adapted not only to keep the battery casing air-tight and water-tight, but also to insulate the positive and negative electrodes. The positive electrode 8 is made of a nickel oxide as the chief ingredient which is previously fully charged or substantially fully charged. The negative electrode 10 is made of metallic cadmium as the chief ingredient and is also previously processed to a fully or substantially fully charged condition. 12 is a separator between the positive electrode 8 and the negative electrode 10 and serves to prevent the electrodes from being short circuited and to maintain the electrolyte between the electrodes. The separator 12 provides ion conduction during the charging and discharging operation. 13 is a spring existing between the cover 9 and the negative electrode 10, the spring being adopted to maintain good electric contact and to fix the electrodes in their predetermined positions. 14 indicates a plurality of gas outlets provided on the cover 9; the sheet 15 is mounted in air-tight and water-tight relationship to the inner surface of the cover 9 by welding, acid soldering or the like.

According to the embodiment just described, the negative electrode is in the fully charged state with little or no uncharged portion remaining therein, so that oxygen absorption and consumption by the negative electrode is very vigorous. Moreover, a hydrogen dispersion means in the form of a sheet of palladium or the like is provided, so as to improve the charging characteristics of the negative electrode even after sealing the battery without increasing the internal pressure of the battery due to accumulation of generated hydrogen, thus actively promoting a vigorous combining reaction of the active material in the negative electrode with the generated oxygen.

The charging and discharging characteristics of a hermetically sealed nickel-cadmium storage battery in accordance with the present invention and a conventional battery are illustrated in Table 2, wherein it is seen that the present storage battery has improved characteristics much superior to the conventional hermetically sealed nickel-cadmium storage battery.

TABLE 2.—CHARGING AND DISCHARGING CHARACTERISTICS OF HERMETICALLY SEALED NICKEL-CADMIUM STORAGE BATTERIES

| | Present battery | Conventional battery |
|---|---|---|
| Nominal capacity (ma. hour) | 500 | 500 |
| Maximum charging current (ma.) | 500 | 50 |
| Charging time required (hours) | 1–2 | 14–16 |
| Discharging capacity at discharging rate of 500 ma. (ma. hour) | 450 | 300 |
| Discharging capacity at discharging rate of 50 ma. (ma. hour) | 750 | 550 |

It has been found that a battery according to the present invention having a nominal capacity of 500 ma. hour can be continuously over-charged with a constant current of 500 ma. for a long period without harmful effects.

It will be seen from Table 2 that it is possible to charge the present storage battery in a very short time, viz, one to two hours. This feature is in sharp contrast to the charging time of a conventional battery which requires a charging time of 14 to 16 hours. The basic reason for the short charging time of the present battery is that the charging state of the negative electrode is at the Point E of FIG. 5, as earlier described, and secondarily the provision of means to disperse generated hydrogen to the exterior of the casing.

Figure 8:
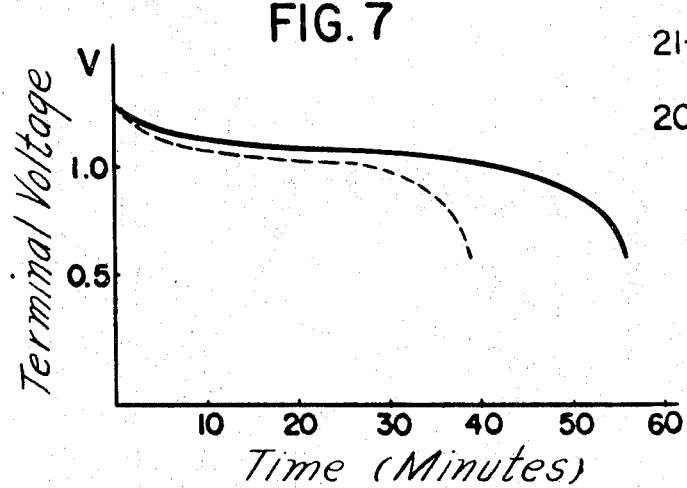
FIG. 8 is a comparative graph showing discharge characteristics of hermetically sealed nickel-cadmium storage batteries of the present invention and the prior art.

FIG. 8 shows characteristic discharge voltages-discharging time when the secondary battery is discharged at a constant current of 500 ma. until the terminal voltage thereof reaches 0.9 volt. Referring to FIG. 8, the full-time curve is the discharge curve of the present battery and the dotted-line curve is the discharge curve of a conventional battery. From the curves, it is seen that the present battery is superior to the conventional one in discharge characteristics.

It will be recalled that the battery or more specifically the plates of the battery of the present invention have been described as being fully charged or substantially fully charged at the final stage of the charging operation. It should be noted that the fully charged condition in the context of the present invention differs from the fully charged condition of the prior art.

It has thus far been customary to consider a battery fully charged when the cell is charged with about 1.4 times of its discharge capacity (ampere-hour=C), i.e., C×1.4. Also, a battery has been considered to be completely formed after 3 or 4 charge and discharge cycles. (See P. E. Plehn, Nickel Cadmium Storage Batteries, Germany, P.B. 42,771 (1946).) Plehn states: "The cell is filled with alkaline electrolyte and is left for 24 hours in order to absorb the electrolyte sufficiently in the electrodes. Then the cell is charged and discharged with a constant current for the formation in the following manner. The current for charge and discharge is 0.2C except for the first charge. The first step comprises charging at 0.133C for 30 hours, discharging until the terminal voltage attains 0.3 to 0.5 volt. The second step comprises charging at 0.2C for 15 hours, discharging to about 1.0 volt. The third step comprises charging at 0.2C for 7 hours, discharging to about 1.0 volt. With these three steps, the formation is completed." Also in U.S. Pat. No. 3,031,517, the examples show the steps of battery formation, wherein the charging steps are at 0.1C for 50 hours, at 0.05C for 150 hours and at 0.2C for 25 hours. This formation procedure is thus quite similar to Plehn's procedure. The cells thus formed according to U.S. Pat. No. 3,031,517, after sealing, will perform well in oxygen absorption as compared to cells prepared according to U.S. Pat. No. 2,571,927, because there is no uncharged portion remaining on the negative electrode. However, the charging characteristics of the cells do not differ from other conventional cells due to incomplete formation; these cells cannot be charged over a short period.

A method of attaining the fully charged condition and state of complete formation according to the present invention will be explained with the aid of the accompanying FIG. 10.

Figure 10:
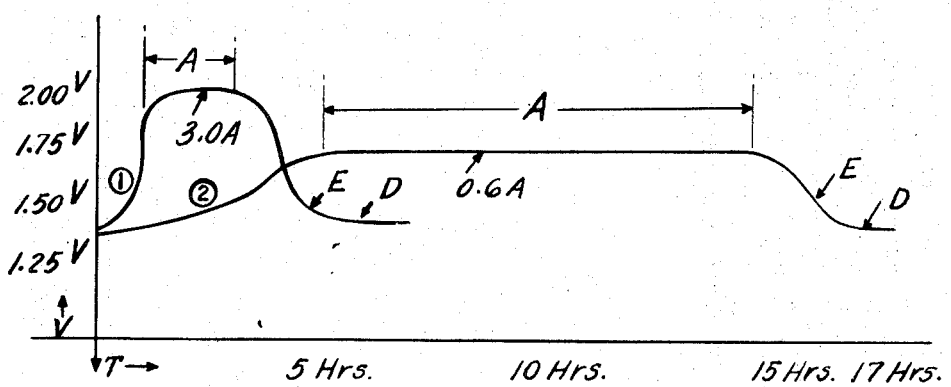
FIG. 10 is a graph showing the charging voltage, current and time at the formation stage of a nickel-cadmium battery of the present invention.

The data for FIG. 10 are representative of nickel-cadmium batteries of the so-called "Sub-C" size, having a nominal capacity of 1.2 ampere-hours. The cell elements of FIG. 10 contain a positive electrode, a negative electrode and a separator, the ratio of the positive electrode to the negative electrode being 1:1. The electrodes are coiled about the separator and then placed in a beaker of 300 cc. capacity provided with 180 cc. of electrolyte (30% KOH). The curves illustrated in FIG. 10 show the charging voltage and time when the cells are charged at 3 amperes for 5 hours and at 0.6 ampere for 17 hours.

The section A represents the fully charged condition or complete formation of the cell conventional in the prior art. However, the fully charged condition or complete formation of cells according to the present invention is shown by the point D. The point D is extremely critical to the present invention. When the voltage is at the peak stage shown by the section A, there is very active gassing indicating generation of both hydrogen and oxygen. It has been found that as the voltage passes the section A and approaches point E, gassing gradually diminishes until finally gassing is barely evident at point D. So far as is known, no one has ever observed the fact that the charging voltage finally drops as shown in FIG. 10 and that gassing stops at the end of the formation process. Nor has anyone attempted to charge a nickel-cadmium storage battery of 1.2 a.h. capacity at as high a current as 3 amperes.

The curves of FIG. 10 represent two formation methods, one at a charging current of 3 amperes and the other at 0.6 ampere. It will be noted that both curves reach the point D as shown. However, if it is desired to make the cell formed at a charging current of 0.6 ampere rechargeable over a short period (1 to 2 hours), it is necessary to subject the cell to a subsequent charging current of 3 amperes after 17 hours charging at 0.6 ampere. In this event, the voltage increases and peaks again, and then reaches point D in a shorter time than the 5 hours required for initial formation at 3 amperes. The cell elements are then placed in its casing and is sealed immediately in order to prevent the negative electrode from being oxidized by oxygen in the air. Alternatively, the cell may be partially or fully discharged and then placed in the container and sealed. This method avoids oxidation of the negative electrode by the atmosphere.

The following disclosure will show a production process according to the present invention. The cell components—positive electrode, negative electrode and separator—are assembled and placed in a casing and filled with the normal amount (about 3.4 to 4.0 cc.) of electrolyte, and then charged in an unsealed condition at 3 amperes for 4 to 5 hours, with water or air cooling as desired. In this case the formation step differs slightly from the formation step in the beakers; the charging voltage shows higher values than shown in FIG. 10 because the amount of electrolyte is limited and the internal resistance is higher than in cells formed in beakers. However, the tendency of the charging characteristic curves are identical with that shown in FIG. 10. Voltage begins to decrease gradually after the peak stage and gassing virtually ceases. This point corresponds to point D, which signifies complete formation or the fully charged condition. Then the cell is replenished with water to compensate for the weight loss of the cell due to the electrolysis of water. Thereafter, the cell is sealed. Sealing after charging should be done promptly in order to prevent the negative electrode from being oxidized by oxygen in the air. Or, as described earlier, it may be more desirable to discharge the cell partially or fully before sealing. It is understood, of course, that the weight loss by electrolysis of water in the formation described above can be compensated for by calculating the weight loss in advance and utilizing excess electrolyte at the beginning of the formation process so that the remaining electrolyte is of the desirable amount and density at the end of the formation step.

FIG. 10 is merely exemplary and it should be understood that the characteristic curves of current-voltage-time will vary slightly depending upon the thickness and porosity of the electrodes and separator, density of the electrolyte, temperature, etc.

As aforenoted, it has been customary in the prior art to consider that the fully charged condition or complete formation has been attained at a point somewhere in the section A on FIG. 10. It has been found that any cell in which the formation voltage passes section A and approaches point E, is more highly efficient than the cells wherein the formation step is terminated when the voltage is in section A and can be recharged in a short period of time. It has also been found that any cells in which the formation step is carried out until the voltage reaches point E or D of FIG. 10, irrespective of the charging current, charging time, the application of special chemicals, formation in an electromagnetic field, etc., possess the desirable qualities aforenoted.

Figure 9:
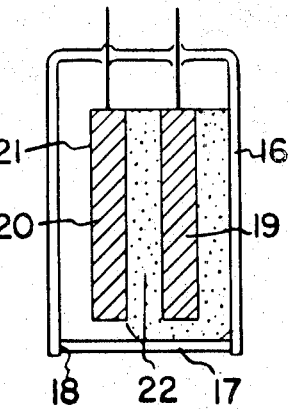
FIG. 9 is a sectional view showing the construction of a hermetically sealed lead-acid storage battery according to the present invention.

It should be noted that the present invention is also applicable to hermetically sealed lead-acid storage batteries. In this case, the material adapted to disperse the hydrogen gas is an acid-resistant highly polymerized compound such as polyvinyl chloride, polyethylene or the like. The sealed battery casing is constructed of said material or said material is mounted on a portion of the battery casing so as not to be wetted by the electrolyte as in the foregoing embodiment. It is also possible to use a pre-molded sheet of palladium as part of the battery casing. One such embodiment is illustrated in FIG. 9. Referring to FIG. 9, 16 is a battery casing of a synthetic resin such as polyvinyl chloride or polyethylene, selected in accordance with the criteria set forth hereinabove. Base 17, of the same or similar material as casing 16, is joined to battery casing 16 at junction 18 by means of welding or the like and is impermeable to all gases except hydrogen. 19 is the positive electrode having lead oxide as the chief ingredient, and 20 is the negative electrode with metallic lead as the chief ingredient. Both electrodes are fully charged or substantially fully charged. It is noted that a portion 21 of the negative electrode 20 is exposed from the electrolyte. 22 is a separator inserted between the positive electrode 19 and the negative electrode 20 and acts to maintain the necessary amount of electrolyte necessary for the charging and discharging operations and also to prevent both electrodes from being short circuited. The separator 22 is a glass-fiber in the form of a mat or fabric or may be an acid-resistant porous synthetic resin such as a vinyl chloride. In assembling the present battery, the positive and negative electrodes are first repeatedly processed by an activation treatment in an open environment and then are fully charged at the final stage of the activation treatment. Thereafter, after confirming that the electric potential of the negative electrode has reached the point D shown in FIG. 10, both negative and positive electrodes are inserted into the battery casing 16 with separator 22 and the casing is sealed after adding sufficient electrolyte, if necessary. The sealed battery casing may then be enclosed in a steel or aluminum external container, if desired. It should be noted that the separator used in the conventional sealed lead-acid storage battery is generally too thick for proper operation; therefore, it is preferable to use a separator having a thickness no greater than about 0.2 mm. and which is highly porous.

It will be apparent from Table 3 that the hermetically sealed lead-acid storage battery of the present invention has charging and discharging characteristics superior to a conventional hermetically sealed lead-acid storage battery.

TABLE 3.—CHARGING AND DISCHARGING CHARACTERISTIC OF HERMETICALLY SEALED LEAD-ACID STORAGE BATTERIES

| | Present battery | Conventiona battery |
|---|---|---|
| Nominal capacity (ma. hour) | 2,000 | 1,000 |
| Maximum charging current (ma.) | 300 | 80 |
| Charging time required (hours) | 7–8 | 14–16 |
| Discharging capacity at discharging rate of 100 ma. (ma. hour) | 2,200 | 1,050 |
| Discharging capacity at discharging rate of 500 ma. (ma. hour) | 1,400 | 600 |

I claim:

1. A hermetically sealed secondary storage battery characterized by the feature that the negative and positive electrode plates are fully charged or substantially fully charged in an unsealed condition at a charging rate about 1 to 5 times the rated capacity of said battery, at the final stage of the charging operating without regard to the electrochemical capacity of said negative and positive electrode plates, a portion of said negative electrode plate being exposed from the electrolyte of said battery, the quantity of electrolyte having been adjusted before sealing by the addition of water in an amount equal to the electrolyte lost by electrolysis of water during charging.

2. A hermetically sealed battery according to claim 1 wherein the battery is discharged prior to being hermetically sealed.

3. A hermetically sealed battery according to claim 2 capable of being recharged at a charging rate about equal its rated capacity in a period of about 1 to 2 hours.

4. A hermetically sealed battery according to claim 1 wherein at least a portion of the battery casing comprises a material adapted to selectively disperse hydrogen generated within said battery to the exterior of said casing.

5. A hermetically sealed battery according to claim 1 wherein at least a portion of the battery casing comprises a material capable of selectively absorbing and fixing hydrogen generated within said battery in the interstices of said material.

6. A hermetically sealed battery according to claim 5 wherein the hydrogen absorbing and fixing material is metallic palladium.

7. A method of manufacturing a hermetically sealed secondary storage battery capable of being recharged at a charging rate about equal its rated capacity in a period of about 1 to 2 hours comprising (a) assembling the positive electrode, negative electrode and separator;
(b) immersing said assembly in an electrolyte in a casing;
(c) charging said negative and positive plates to a fully charged or substantially fully charged condition and until visually perceptible hydrogen and oxygen generation ceases; and
(d) replenishing any electrolyte lost by electrolysis of water during charging; and
(e) hermetically sealing said assembly within said casing.

8. A method according to claim 7 wherein the negative and positive plates are charged at a charging rate about 1 to 5 times the rated capacity of the battery for a period of about 2 to 10 hours.

9. A method according to claim 7 wherein the negative and positive plates are charged at a charging rate about 0.5 times the rated capacity of the battery for a period of about 15 hours and is subsequently further charged at a charging rate about 1 to 5 times the rated capacity of the battery for a period of about 1 to 5 hours.

References Cited

UNITED STATES PATENTS

| | | | |
|---|---|---|---|
| 3,159,508 | 12/1964 | Chreitzberg | 136—166 |
| 3,445,287 | 5/1969 | Scholzel | 136—6 |

WINSTON A. DOUGLAS, Primary Examiner

D. L. WALTON, Assistant Examiner

U.S. Cl. X.R.

136—176